(12) United States Patent
Wilke et al.

(10) Patent No.: US 7,423,077 B2
(45) Date of Patent: Sep. 9, 2008

(54) COATING MATERIALS, METHOD FOR THEIR PRODUCTION AND USE OF SAID MATERIALS

(75) Inventors: Guido Wilke, Essinger (DE); Vince Cook, Münster (DE); Thomas Farwick, Billerbeck (DE)

(73) Assignee: BASF Coatings AG, Munster (DE)

( * ) Notice: Subject to any disclaimer, the term of this patent is extended or adjusted under 35 U.S.C. 154(b) by 381 days.

(21) Appl. No.: 10/543,274

(22) PCT Filed: Jan. 20, 2004

(86) PCT No.: PCT/EP2004/000393

§ 371 (c)(1),
(2), (4) Date: Jul. 25, 2005

(87) PCT Pub. No.: WO2004/069885

PCT Pub. Date: Aug. 19, 2004

(65) Prior Publication Data

US 2006/0142440 A1     Jun. 29, 2006

(30) Foreign Application Priority Data

Feb. 7, 2003     (DE)     ................. 103 05 115

(51) Int. Cl.
*C08K 5/34* (2006.01)

(52) U.S. Cl. ...................................... 524/100; 524/507
(58) Field of Classification Search ............. 524/100, 524/507
See application file for complete search history.

(56) References Cited

U.S. PATENT DOCUMENTS

| 6,632,495 B1 | 10/2003 | Wegner ................... 428/35.8 |
| 2004/0094425 A1 | 5/2004 | Grosse-Brinkhaus et al. .... 205/198 |

FOREIGN PATENT DOCUMENTS

| DE | 199 14 898 | 5/2000 |
| DE | 100 52 438 | 2/2002 |

*Primary Examiner*—Peter D Mulcahy

(57) ABSTRACT

Coating materials, processes for preparing them, and their use. The coating materials include hydroxyl-containing (meth)acrylate (co)polymer, carbamate- and hydroxyl-functional compound, an amino resin, and a triazine compound. At least 10 equivalent % of the hydroxyl groups present in (A) and/or (B) are primary hydroxyl groups. The coating materials after curing have a storage modulus E' in the rubber-elastic range of at least $1.5*10^7$ Pa, the storage modulus E' having been measured by dynamic mechanical thermoanalysis (DMTA) on homogeneous free films with a thickness of $40\pm10$ μm.

21 Claims, No Drawings

US 7,423,077 B2

COATING MATERIALS, METHOD FOR THEIR PRODUCTION AND USE OF SAID MATERIALS

CROSS REFERENCE TO RELATED APPLICATIONS

This application is a National Phase Application of Patent Application based on PCT/EP2004/000393, filed 20 Jan. 2004, which claims priority to DE 10305115.5, filed on 7 Feb. 2003.

DESCRIPTION

1. Field of the Invention

The present invention relates to novel coating materials. The present invention also relates to a novel process for preparing coating materials. The present invention further relates to the use of the novel coating materials for producing coatings, adhesive films, seals, moldings and self-supporting films, preferably scratchproof coatings, more preferably scratchproof clearcoats, especially for scratchproof multicoat paint systems.

2. Prior Art

In years gone by great advances have been made in the development of acid-resistant and etch-resistant clearcoats for automotive OEM finishing. In recent times an increased desire has now arisen on the part of the automobile industry for scratchproof clearcoats which at the same time retain the existing level in terms of their other properties.

International patent application WO 98/40442 discloses coating materials which lead to scratchproof coatings. These coating materials in the cured state have a storage modulus E' of at least $10^7$ Pa. The coating materials comprise as binders hydroxyl-functional (meth)acrylate copolymers having a hydroxyl number of 100 to 240 mg KOH/g, an acid number from 0 to 35 mg KOH/g, a number-average molecular weight from 1,500 to 10,000 daltons, and a glass transition temperature of not more than 70° C., more preferably from −40 to +30° C. The hydroxyl-functional (meth)acrylate copolymers ought to contain as many primary hydroxyl groups as possible. More preferably at least 50 to 100% of the hydroxyl groups present are primary hydroxyl groups. Crosslinking agents used are amino resins, tris(alkoxycarbonylamino)triazines and/or polyisocyanates. The use of compounds containing at least one carbamate group and at least one hydroxyl group is not described. The coatings produced from the known coating materials possess high scratch resistance, high gloss, good chemical resistance, and good weathering stability. The etch resistance, on the other hand, leaves something to be desired. Furthermore, it is necessary to improve the chemical resistance still further in order to satisfy the heightened requirements of the market.

European patent application EP 0 675 141 A1 discloses a coating material whose binder is a methacrylate copolymer with a number-average molecular weight of 3,071 daltons, containing primary hydroxyl groups and carbamate groups, and whose crosslinking agent is an amino resin. The binder is comparatively viscous, and for that reason the coating material is comparatively difficult to apply. Although the coating produced from it has a high gloss, its etch resistance, hardness and impact strength leave much to be desired.

In order to improve the level of properties of this known coating material and of the coating produced from it, EP 0 675 141 A1 proposes using as binder (meth)acrylate copolymers which contain carbamate groups and sterically hindered secondary hydroxyl groups. It is true that these binders may also contain primary hydroxyl groups. As is apparent from the examples of the European patent application, however, binders containing no primary hydroxyl groups are preferred. These binders have a comparatively low viscosity, and so the coating materials in question are easier to apply. The coatings produced from them possess good chemical resistance, etch resistance, hardness, and impact strength, and also a high gloss. Indications as to the scratch resistance, however, are lacking.

European patent application EP 0 915 113 A1 discloses coating materials comprising as binders (i) compounds such as (meth)acrylate copolymers containing hydroxyl groups and carbamate groups or (ii) compounds such as (meth)acrylate copolymers containing hydroxyl groups and (iii) a compound containing carbamate groups, and, as crosslinking agents, polyisocyanates and amino resins.

The (meth)acrylate copolymers (ii) have a number-average molecular weight of from 1,000 to 40,000 and a glass transition temperature of from −20 to +80° C. and contain preferably primary hydroxyl groups (cf. EP 0 915 113 A1, page 5, lines 9 and 10 and page 6, lines 10 to 13).

The compounds (iii) containing carbamate groups may also contain hydroxyl groups, the ratio of hydroxyl to carbamate groups being unspecified. They can also be used as binders (i). Whether and, if so, to what extent the hydroxyl-containing compounds (iii) might also be used in combination with the (meth)acrylate copolymers (ii) is not apparent from EP 0 915 113 A1.

According to the examples of EP 0 915 113 A1 it is preferred to use (meth)acrylate copolymers (iii) containing secondary hydroxyl groups and carbamate groups as binders on their own. Thus, for example, the methacrylate copolymer of example 1 has a carbamate equivalent weight CEW of 493 g/equivalent and a hydroxyl equivalent weight of 493 g/equivalent. Data on number-average molecular weight and glass transition temperature are absent. The multicoat paint systems produced with the aid of the coating material have a good etch resistance but their scratch resistance leaves much to be desired.

European patent EP 0 994 930 B 1 discloses coating materials comprising (meth)acrylate copolymer binders containing primary and secondary hydroxyl groups. The (meth)acrylate copolymers have a number-average molecular weight of from 5,000 to 25,000, a hydroxyl equivalent weight of from 300 to 800 g/equivalent and a glass transition temperature of at least +10° C. The (meth)acrylate copolymers may also contain an unspecified number of carbamate groups. The combination of the carbamate-free (meth)acrylate copolymers with compounds containing carbamate groups is as little apparent from the patent as the ratio of hydroxyl to carbamate groups. Amino resin crosslinking agents are used. In addition, polyisocyanates and/or tris(alkoxycarbonylamino)triazines (TACT) may be used as further crosslinking agents.

The coatings produced from the known coating materials are intended on the one hand to have the durability, hardness, gloss and overall optical appearance normally possessed by the coatings produced from coating materials based on hydroxyl-containing (meth)acrylate copolymers and amino resins and on the other hand to have the etch resistance normally possessed by the coatings produced from coating materials based on hydroxyl/isocyanate, epoxy/acid, and carbamate/amino resin crosslinking systems. The scratch resistance and the chemical resistance, particularly the motor fuel resistance, of these known coatings, however, continues to leave much to be desired.

According to European patent EP 1 042 402 B1 the scratch resistance and abrasion resistance of the coatings produced from the coating materials known from European patent EP 0 994 930 B1 are improved by adding tris(alkoxycarbonylamino)triazines (TACT) to the coating materials as additional crosslinking agents. However, the known coatings do not attain the scratch resistance which must be attained in order that damage no longer occurs to the coatings in practice in car wash installations.

PROBLEM ADDRESSED BY THE INVENTION

It is an object of the present invention to provide coating materials which no longer have the disadvantages of the prior art but which instead are stable on storage and easy and convenient to apply. Following application and curing, the novel coating materials should produce coatings which combine a particularly high scratch resistance with very good chemical resistance and etch resistance, particularly in the pancreatin, tree resin, and gasoline tests, and very good appearance.

Furthermore, the coatings should be resistant in particular toward concentrated sulfuric acid and oil soot and should possess a high yellowing resistance.

Not least, the novel coating materials should be suitable for producing coatings, adhesive films, and seals, preferably scratchproof coatings, more preferably scratchproof clearcoats, especially scratchproof multicoat paint systems for the automotive sector.

SOLUTION PROVIDED BY THE INVENTION

The invention accordingly provides the novel coating materials, comprising
(A) at least one hydroxyl-containing (meth)acrylate (co)polymer having a hydroxyl number of from 100 to 250 mg KOH/g, an acid number of from 0 to 35 mg KOH/g, a number-average molecular weight $M_n$ of from 1,200 to 20,000 daltons, and a glass transition temperature of not more than +70° C.,
(B) at least one carbamate- and hydroxyl-functional compound having a hydroxyl number of from 10 to 150 mg KOH/g, a carbamate equivalent weight CEW of from 250 to 700 g/equivalent and an equivalents ratio of hydroxyl to carbamate groups of from 1:20 to 1:0.5,
(C) at least one amino resin, and
(D) at least one compound of the general formula

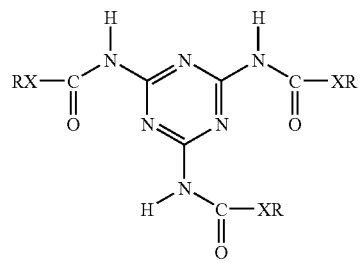

in which the variable R stands for an alkyl group having 1 to 12 carbon atoms, a cycloalkyl group having 3 to 12 carbon atoms or an aryl group having 6 to 20 carbon atoms and the variable X stands for a nitrogen, oxygen or sulfur atom;
where
(I) at least 10 equivalent % of the hydroxyl groups present in the (meth)acrylate (co)polymers (A) and/or the compounds (B) are primary hydroxyl groups and
(II) the coating materials after curing have a storage modulus E' in the rubber-elastic range of at least $1.5*10^7$ Pa, the storage modulus E' having been measured by dynamic mechanical thermoanalysis (DMTA) on homogeneous free films with a thickness of 40±10 μm.

The novel coating materials are referred to below as "coating materials of the invention".

The invention also provides a novel process for preparing coating materials, in which
(A) at least one hydroxyl-containing (meth)acrylate (co)polymer,
(B) at least one compound containing carbamate groups and hydroxyl groups,
(C) at least one amino resin, and
(D) at least one compound of the general formula

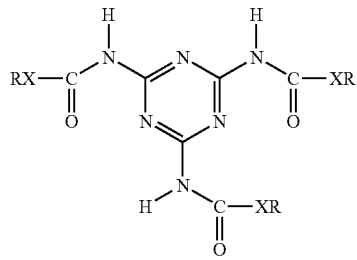

in which the variable R stands for an alkyl group having 1 to 12 carbon atoms, a cycloalkyl group having 3 to 12 carbon atoms or an aryl group having 6 to 20 carbon atoms and the variable X stands for a nitrogen, oxygen or sulfur atom are mixed with one another and the resulting mixture is homogenized, the constituents of the coating materials being selected such that
(I) at least 10 equivalent % of the hydroxyl groups present in the (meth)acrylate (co)polymers (A) and/or the compounds (B) are primary hydroxyl groups and
(II) the coating materials after curing have a storage modulus E' in the rubber-elastic range of at least $1.5*10^7$ Pa, the storage modulus E' having been measured by dynamic mechanical thermoanalysis on homogeneous free films with a thickness of 40±10 μm.

The novel process for preparing coating materials is referred to below as "process of the invention".

Further subject matters of the invention will become apparent from the description.

THE ADVANTAGES OF THE INVENTION

In the light of the prior art it was surprising and unforeseeable for the skilled worker that the object on which the present invention was based could be achieved by means of the coating materials of the invention and by means of the process of the invention.

In particular it was surprising that the coating materials of the invention produced coatings, particularly clearcoats for multicoat paint systems on motor vehicle bodies, which were distinguished simultaneously by high scratch resistance and by a high level of resistance to pancreatin, tree resin, and gasoline, especially FAM standard test motor fuel (50% by volume toluene, 30% by volume isooctane, 15% by volume diisobutylene, 5% by volume ethanol). The test known as the FAM test is carried out in accordance with VDA [German Automakers' Association] test bulletin 621-412 (based on DIN standard 53 168). Furthermore, the coatings of the invention were hard, highly glossy, condensation-resistant, and of high yellowing resistance and adhesive strength.

It was also surprising that the coating materials of the invention were suitable as adhesives and sealants for producing adhesive films and seals and also as starting products for producing self-supporting films and moldings.

The adhesive films, seals, self-supporting films and moldings of the invention likewise had outstanding performance properties.

DETAILED DESCRIPTION OF THE INVENTION

It is critical to the invention that the coating materials and/or their constituents are selected such that the cured coating material has a storage modulus E' in the rubber-elastic range, i.e., an energy component (elastic component) which is recoverable in the deformation of a viscous elastic material such as a polymer, for example, of at least $1.5*10^7$ Pa, preferably of at least $5*10^7$ Pa, more preferably of at least $8*10^7$ Pa, very preferably of at least $10*10^7$ Pa, and with particular preference of at least $14*10^7$ Pa, the storage modulus E' having been measured by dynamic mechanical thermoanalysis (DMTA) on homogeneous free films with a thickness of 40±10 µm.

DMTA is a widely known measurement method for determining the viscous elastic properties of coatings and is described, for example, in Murayama, T., Dynamic Mechanical Analysis of Polymeric Materials, Elsevier, N.Y., 1978 and Loren W. Hill, Journal of Coatings Technology, Vol. 64. No.808, May 1992, pages 31 to 33. The process conditions are described in detail by Th. Frey, K.-H. Grosse Brinkhaus and U. Röckrath in Cure Monitoring of Thermoset Coatings, Progress in Organic Coatings 27 (1996), 59-66 or in German patent application DE 44 09 715 A1 or in German patent DE 197 09 467 C2.

The storage modulus E' is measured on homogeneous free films. The free films are produced conventionally by applying the coating material in question to substrates and curing it, the substrates being those to which the coating produced does not adhere. Examples that may be mentioned of suitable substrates include glass, Teflon, and, in particular, polypropylene. Polypropylene has the advantage of ready availability and is therefore normally used as support material. Preference is given to employing the following conditions: tensile mode; amplitude: 0.2%; frequency: 1 Hz; temperature ramp: 1° C./min from room temperature to 200° C.

The measurements can be conducted, for example, with the instruments MK II, MK III or MK IV from the company Rheometric Scientific.

The specific selection of the coating materials by way of the value of the storage modulus E' in the rubber-elastic range at 20° C. of the cured coating materials makes it possible in a simple way to provide coating materials having the desired good scratch resistance, since the parameter can be determined by means of simple DMTA measurements.

The energy component consumed (dissipated) in the deformation of the viscous elastic material is described by the size of the loss modulus E". The loss modulus E" is likewise dependent on the rate of deformation and the temperature. The loss factor tanδ is defined as the quotient formed from the loss modulus E" and the storage modulus E'. tanδ can likewise be determined with the aid of DMTA and represents a measure of the relationship between the elastic and plastic properties of the film. The loss factor tanδ may vary; preferably at 20° C. it is not more than 0.10, preferably not more than 0.06.

The value of the storage modulus E' can be controlled by way of the selection of the binders and crosslinking agents.

For example, the storage modulus increases as the hydroxyl number of the below-described binders (A) and (B) overall goes up and as the carbamate equivalent weight CEW of component (B) goes down and as the proportion of primary hydroxyl groups in the below-described binders (A) and (B) goes up.

The coating materials of the invention comprise at least one hydroxyl-containing (meth)acrylate (co)polymer (A) having a hydroxyl number of from 100 to 250, preferably from 160 to 220, and more preferably from 170 to 200 mg KOH/g, an acid number of from 0 to 35 and preferably from 0 to 25 mg KOH/g, a glass transition temperature of not more than +70° C. and preferably from −40° C. to +70° C., and a number-average molecular weight of from 1,200 to 20,000, preferably from 1,500 to 15,000 and more preferably from 1,500 to 10,000 daltons. It is important that the hydroxyl content of the (meth)acrylate (co)polymer (A) or (B) is chosen so that at least 10%, preferably at least 15%, and more preferably at least 20 equivalent % of the hydroxyl groups present in (A) and/or (B) are primary hydroxyl groups. With particular preference the primary hydroxyl groups originate predominantly, in particular substantially completely, from component (A). In principle, all (meth)acrylate (co)polymers (A) having the stated characteristics (hydroxyl number, acid number, glass transition temperature and number-average molecular weight) are suitable provided that they lead, after crosslinking, to coatings having the stated viscous elastic parameters.

The glass transition temperature can be calculated approximately by the skilled worker with the aid of the formula $$\frac{1}{T_g} = \sum_{1}^{i} \frac{W_i}{T_{g,i}}$$

$T_g$=glass transition temperature of the polymer
i=number of different copolymerized monomers
$W_i$=weight fraction of the ith monomer
$T_{g,i}$=glass transition temperature of the homopolymer of the ith monomer.

The coating materials are prepared using, for example, methacrylate copolymers (A1) obtainable by copolymerizing (a1) from 10 to 51% by weight, preferably from 20 to 45% by weight, of 4-hydroxy-n-butyl acrylate or 4-hydroxy-n-butyl methacrylate or a mixture of 4-hydroxy-n-butyl acrylate and 4-hydroxy-n-butyl methacrylate, (b1) from 0 to 36% by weight, preferably from 0 to 20% by weight, of a hydroxyl-containing ester of acrylic acid or a hydroxyl-containing ester of methacrylic acid, other than (a1), or of a mixture of such monomers, (c1) from 28 to 58% by weight, preferably from 34 to 50% by weight, of an aliphatic or cycloaliphatic ester of (meth) acrylic acid having at least 4 carbon atoms in the alcohol residue, other than (a1) and (b1), or of a mixture of such monomers, (d1) from 0 to 3% by weight, preferably from 0 to 2% by weight, of an ethylenically unsaturated carboxylic acid or of a mixture of ethylenically unsaturated carboxylic acids, and (e1) from 0 to 40% by weight, preferably from 5 to 35% by weight, of a vinylaromatic and/or of an ethylenically unsaturated monomer other than (a1), (b1), (c1), and (d1), or of a mixture of such monomers, the sum of the weight fractions of components (a1), (b1), (c1), (d1) and (e1) always being 100% by weight.

The preferred glass transition temperature of this methacrylate copolymer (A1) is from −40 to +70° C.

The coating materials are also prepared using, for example, methacrylate copolymers (A2) obtainable by copolymerizing (a2) from 10 to 51% by weight, preferably from 20 to 45% by weight, of a hydroxyl-containing methacrylate, preferably hydroxypropyl methacrylate or hydroxyethyl methacrylate, or a mixture of such monomers, preferably a mixture of hydroxypropyl methacrylate and hydroxyethyl methacrylate, (b2) from 0 to 36% by weight, preferably from 0 to 20% by weight, of a hydroxyl-containing ester of acrylic acid or a hydroxyl-containing ester of methacrylic acid, other than (a2), or of a mixture of such monomers, (c2) from 28 to 58% by weight, preferably from 34 to 50% by weight, of an aliphatic or cycloaliphatic ester of (meth) acrylic acid having at least 4 carbon atoms in the alcohol residue, other than (a2) and (b2), or of a mixture of such monomers, (d2) from 0 to 3% by weight, preferably from 0 to 2% by weight, of an ethylenically unsaturated carboxylic acid or of a mixture of ethylenically unsaturated carboxylic acids, and (e2) from 0 to 40%, preferably from 5 to 35% by weight, of a vinylaromatic and/or of an ethylenically unsaturated monomer other than (a2), (b2), (c2), and (d2), or of a mixture of such monomers, the sum of the weight fractions of components (a2), (b2), (c2), (d2) and (e2) always being 100% by weight.

The preferred glass transition temperature of this methacrylate copolymer (A2) is from −40 to ±70° C.

The (meth)acrylate (co)polymers (A) used with preference in accordance with the invention, especially the methacrylate copolymers (A1) and (A2), can be prepared by polymerization methods which are well and generally known. Polymerization methods for preparing polyacrylate resins are common knowledge and have been described in many instances (cf. e.g. Houben-Weyl, Methoden der organischen Chemie, 4$^{th}$ Edition, Volume 14/1, pages 24 to 255 (1961)).

The (meth)acrylate (co)polymers (A) used with preference in accordance with the invention are prepared in particular with the aid of the solution polymerization method. In this case usually an organic solvent or solvent mixture is introduced as an initial charge, which is heated to boiling. The monomer mixture to be polymerized, together with one or more polymerization initiators, is then added continuously to this organic solvent or solvent mixture. The polymerization takes place at temperatures between 100 and 160° C., preferably between 130 and 150° C. polymerization initiators used are preferably initiators which form free radicals.

The type and amount of initiator are normally chosen so that the supply of free radicals during the feed phase at the polymerization temperature is very largely constant.

Examples of initiators which can be used include the following: dialkyl peroxides, such as di-tert-butyl peroxide and dicumyl peroxide; hydroperoxides, such as cumene hydroperoxide and tert-butyl hydroperoxide; peresters, such as tert-butyl perbenzoate, tert-butyl perpivalate, and tert-butyl per-2-ethylhexanoate; and bisazo compounds such as azobisisobutyronitrile.

The polymerization conditions (reaction temperature, feed time of the monomer mixture, amount and type of organic solvents and polymerization initiators, possible use of molecular weight regulators, such as mercaptans, thioglycolates, and hydrogen chlorides) are selected such that the polyacrylate resins used with preference have a number-average molecular weight of from 1,200 to 20,000, preferably from 1,500 to 15,000, more preferably from 1,500 to 10,000 (determined by gel permeation chromatography using a polystyrene standard).

The acid number of the (meth)acrylate (co)polymers (A) used in accordance with the invention can be set by the skilled worker using appropriate amounts of carboxyl-functional monomers. The same applies to the setting of the hydroxyl number, which can be controlled by way of the amount of hydroxyl-functional monomers used.

As component (a1) it is possible to use 4-hydroxy-n-butyl acrylate, 4-hydroxy-n-butyl methacrylate or a mixture of 4-hydroxy-n-butyl acrylate and 4-hydroxy-n-butyl methacrylate. In one preferred embodiment the component (a1) used is 4-hydroxy-n-butyl acrylate.

As component (a2) it is possible to use hydroxyalkyl esters of methacrylic acid, particularly those in which the hydroxyalkyl group contains up to 8, preferably up to 6, and more preferably up to 4 carbon atoms, or mixtures of these hydroxyalkyl esters. Examples of such hydroxyalkyl esters include 2-hydroxypropyl methacrylate, 3-hydroxypropyl methacrylate and 2-hydroxyethyl methacrylate.

As component (b1) and, respectively, (b2) it is possible in principle to use any hydroxyl-containing ester of acrylic acid or methacrylic acid other than (a1) or (a2), or a mixture of such monomers. Examples of (b1) and (b2) include the following: hydroxyalkyl esters of acrylic acid, such as 2-hydroxyethyl acrylate, 2-hydroxypropyl acrylate, 3-hydroxypropyl acrylate or 3-hydroxybutyl acrylate and hydroxyalkyl esters of methacrylic acid, such as hydroxyethyl methacrylate and hydroxypropyl methacrylate, and also the esterification products of hydroxyalkyl (meth)acrylates with one or more molecules of ε-caprolactone. Also suitable are reaction products of acrylic and/or methacrylic acid with a glycidyl ester. Glycidyl esters can be obtained by reacting a monofunctional carboxylic acid (e.g., octanoic acid, benzoic acid, benzilic acid, cyclohexanoic acid) with an epihalohydrin (e.g., epichlorohydrin) under the known reaction conditions. Glycidyl esters are available commercially, for example, as Cardura® E from Shell, Glydexx® N-10 from Exxon or Araldit® PT910 from Ciba. Glycidyl esters may be represented by the following formula:

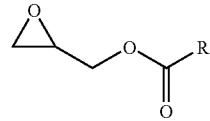

in which R is a substituted or unsubstituted hydrocarbon radical having 1 to 40, preferably 1 to 20, and more preferably 1 to 12 carbon atoms. Polyglycidyl esters may likewise be used and are preparable by reacting a polyfunctional carboxylic acid (e.g. phthalic acid, thioglycolic acid, adipic acid) with an epihalohydrin. Polyglycidyl esters may likewise be represented by the above formula. In this case, R is substituted by one or more glycidyl ester groups. Preference is given to using the commercial products sold under the brand name Cardurao®, Glydeex® or Araldit®.

As component (c1) and, respectively, (c2) it is possible in principle to use any aliphatic or cycloaliphatic ester of (meth) acrylic acid having at least 4 carbon atoms in the alcohol residue, other than (a1) or (a2) and (b1) or (b2), or a mixture of such monomers. Examples include the following: aliphatic esters of (meth)acrylic acid with 4 to 20 carbon atoms in the alcohol residue, such as n-butyl, iso-butyl, tert-butyl, 2-ethylhexyl, stearyl and lauryl methacrylate, and cycloaliphatic esters of (meth)acrylic acid such as cyclohexyl methacrylate, for example.

As component (d1) or (d2) it is possible in principle to use any ethylenically unsaturated carboxylic acid or a mixture of ethylenically unsaturated carboxylic acids. As component (d1) or (d2) it is preferred to use acrylic acid and/or methacrylic acid.

As component (e1) or (e2) it is possible in principle to use any ethylenically unsaturated monomer other than (a1) or (a2), (b1) or (b2), (c1) or (c2) and (d1) or (d2), or a mixture of such monomers. Examples of monomers which can be used as component (e1) or (e2) include the following: vinylaromatic hydrocarbons, such as styrene, α-alkylstyrene and vinyltoluene, amides of acrylic acid and methacrylic acid, such as methacrylamide and acrylamide; nitriles of methacrylic acid and acrylic acid; vinyl ethers and vinyl esters. As component (e) it is preferred to use vinylaromatic hydrocarbons, especially styrene.

The coating materials of the invention comprise at least one compound B) which bears carbamate groups and hydroxyl groups.

The compound B) has a hydroxyl number of from 10 to 150, preferably from 15 to 120, and more preferably from 20 to 100 and a carbamate equivalent weight CEW of from 250 to 700, preferably from 300 to 600, more preferably from 350 to 500, and with very particular preferance from 360 to 450.

The ratio of hydroxyl groups to carbamate groups in the compound B) is from 1:20 to 1:0.5, preferably from 1:15 to 1:0.8, and more preferably from 1:10 to 1:1.

Carbamate groups can be obtained in various ways. It is possible, for example, to react cyclic carbonate groups, epoxy groups, and unsaturated bonds to form carbamates.

Cyclic carbonate groups can be converted to carbamate groups by reacting them with ammonia or primary amines, with the ring of the cyclic carbonate group being opened and a β-hydroxyl carbamate being formed.

Epoxy groups can be converted into carbamate groups by reacting them first with $CO_2$ to form a cyclic carbonate, after which the further reaction can then take place as outlined above. The reaction with $CO_2$ can take place at pressures between atmospheric pressure and supercritical $CO_2$, it being preferred to carry out the reaction under superatmospheric pressure (e.g., from 400 to 1050 kPa). The temperature for carrying out this reaction is preferably between 60 and 150° C. Catalysts which can be used when carrying out this reaction are those which activate an oxirane ring, such as tertiary amines or quaternary salts (e.g., tetramethylammonium bromide), combinations of complex organotin halides and alkylphosphonium halides (e.g., $(CH_3)_3SnI$, $(C_4H_9)_3SNI$, $Bu_4PI$ and $(CH_3)_4PI$), potassium salts (e.g., $K_2CO_3$, $KI$) preferably in combination with crown ethers, tin octoate, calcium octoate, and the like.

Unsaturated bonds can be converted to carbamates by reacting them first with peroxide to give epoxides, then with $CO_2$ to give cyclic carbonates, and thereafter with ammonia or primary amines to give carbamates.

The carbamate may be primary, i.e., ending in an $NH_2$ group, or secondary, i.e., ending in an NHR group where R is an organic radical. In a preferred embodiment the carbamate is primary.

Another way to obtain compounds (B) is to react an alcohol (an alcohol being a compound bearing one or more hydroxyl groups) with more than one urea compound in order to obtain a compound which bears carbamate groups. This reaction is carried out with heating of a mixture of alcohol and urea. It is preferred to add a catalyst.

Another possibility is the reaction of an alcohol with cyanic acid (HOCN) to produce a compound having primary carbamate groups.

Carbamates may likewise be obtained by reacting an alcohol with phosgene followed by a reaction with ammonia, giving compounds having primary carbamate groups, or they can be obtained by reacting an alcohol with phosgene followed by reaction with a primary amine, in which case compounds having secondary carbamate groups result.

A further way is to react an isocyanate (e.g., HDI, IPDI) with a compound such as hydroxypropyl carbamate to give a carbamate-blocked isocyanate derivative.

Introducing the carbamate group into the compound B) can also be done, if compound B) is a polymer, by incorporating monomers which contain carbamate groups. Examples of suitable monomers of this kind are ethylenically unsaturated monomers which contain a carbamate group.

One possibility is to prepare a (meth)acrylic monomer having a carbamate function in the ester moiety of the monomer. Such monomers are known and are described in, for example, American patents U.S. Pat. No. 3,479,328 A, U.S. Pat. No. 3,674,838 A, U.S. Pat. No. 4,126,747 A, U.S. Pat. No. 4,279,833 A and U.S. Pat. No. 4,340,497 A.

Further methods of obtaining the monomers are known to the skilled worker and may likewise be employed.

The acrylic monomer, together where appropriate with other ethylenically unsaturated monomers, can then be (co)polymerized by methods which are common knowledge.

Alternatively, the carbamate group may be introduced into the compound B) by means of polymer-analogous reactions. Examples of suitable methods of this kind are known from patents U.S. Pat. No. 4,758,632 A, U.S. Pat. No. 4,301,257 A or U.S. Pat. No. 2,979,514 A.

One possibility of preparing carbamate-functional polymers by a polymer-analogous route is to carry out thermal cleavage of urea in the presence of a hydroxyl-functional (meth)acrylate (co)polymer (in order to liberate ammonia and HNCO), which then gives a carbamate-functional (meth)acrylate (co)polymer.

It is likewise possible to react the hydroxyl group of a hydroxyalkyl carbamate with the isocyanate group of an isocyanate-functional acrylic or vinylic monomer to give a carbamate-functional component. Isocyanate-functional (meth)acrylates are known and are described in, for example, U.S. Pat. No. 4,301,257 A. Isocyanate-functional vinyl monomers are likewise known and include olefinically unsaturated m-tetramethylxylene isocyanate (available under the name TMI® from American Cyanamid).

Yet another possibility is to react cyclic carbonate groups of a polymer containing such groups with ammonia in order to form a polymer which contains carbamate groups. Polymers containing cyclic carbonate groups are likewise known and are described in, for example, U.S. Pat. No. 2,979,514 A.

A somewhat more complicated but likewise possible route to the preparation of polymers containing carbamate groups is the transesterification of a (meth)acrylate (co)polymer with a hydroxyalkyl carbamate.

Also conceivable is the preparation of the compounds (B) by the reaction of hydroxyl-containing polymers with phosgene and subsequently with ammonia, as described in, for example, DE 199 46 048 and DE 101 29 969.

A preferred route, however, is to react an existing polymer, such as a (meth)acrylate (co)polymer, for example, with another component in order to attach a carbamate group to the existing polymer backbone, as is described in, for example, U.S. Pat. No. 4,758,632 A.

Carbamates can be obtained with preference by polymer-analogous transcarbamation. In this case an alcohol is caused to react with an alkyl carbamate (e.g., methyl carbamate, ethyl carbamate, butyl carbamate) to give a compound containing primary carbamate groups. This reaction is carried out with heating, preferably in the presence of a catalyst, such as organometallic catalysts (e.g., dibutyltin dilaurate).

Further possibilities for the preparation of carbamates are known to the skilled worker and are described in, for example, P. Adams F. Baron, "Esters of Carbamic Acid", *Chemical Review*, v. 65, 1965.

In the preparation of these compounds (B) it should be ensured, in the case of subsequent introduction of the carbamate group, for example, that both hydroxyl groups and carbamate groups are present in sufficient number in the final compound (B).

Compound (B) is preferably polymeric.

Suitable polymers (B) come from the polymer classes of the random, alternating and/or block, linear and/or branched and/or comb, addition (co)polymers of ethylenically unsaturated monomers, or polyaddition resins and/or polycondensation resins. For further details of these terms refer to Römpp Lexikon Lacke und Druckfarben, Georg Thieme Verlag, Stuttgart, New York, 1998, page 457, "Polyaddition" and "Polyaddition resins (Polyadducts)", and also pages 463 and 464, "Polycondensates", "Polycondensation", and "Polycondensation resins".

Examples of highly suitable addition (co)polymers (B) are (meth)acrylate (co)polymers and partially hydrolyzed polyvinyl esters, especially (meth)acrylate (co)polymers.

Examples of highly suitable polyaddition resins and/or polycondensation resins (B) are polyesters, alkyds, polyurethanes, polylactones, polycarbonates, polyethers, epoxy resin-amine adducts, polysiloxanes, polyureas, polyamides or polyimides, especially polyesters.

With very particular preference the polymers (B) come from the polymer classes of (meth)acrylate (co)polymers.

Processes for preparing the carbamate-functional polymers (B) which come from the aforementioned polymer classes are known from patent applications EP 0 675 141 B1, page 2 line 44 to page 5 line 15 and page 8 line 5 to page 10 line 41, and EP 0 915 113 A1, Example 1, page 11 lines 3 to 15.

The polymers (B) are preferably prepared by copolymerizing a monomer mixture comprising at least one olefinically unsaturated carboxylic acid, methacrylic acid for example, in the presence of a glycidyl ester of Versatic® acid (cf. Römpp Lexikon Lacke und Druckfarben, Georg Thieme Verlag, Stuttgart New York, 1998 "Versatic® Acids", pages 605 and 606) and then reacting the resultant hydroxyl-containing (meth)acrylate (co)polymer with at least one alkyl carbamate, such as methyl, propyl, or butyl carbamate.

As compound (B) consideration may also be given to a (meth)acrylate copolymer (B1) obtainable by copolymerizing (a) from 10 to 50%, preferably from 10 to 40% by weight, more preferably from 20 to 30% by weight of a hydroxyl-containing (meth)acrylate or of a mixture of such monomers, (b) from 0 to 50% by weight, preferably from 10 to 40% by weight, of a monomer containing at least one carbamate group, the carbamate group being a reaction product of an epoxide and an acid with subsequent reaction of the resultant hydroxyl group to form carbamate, or of a mixture of such monomers, (c) from 5 to 58% by weight, preferably from 5 to 45% by weight, of an aliphatic or cycloaliphatic ester of (meth)acrylic acid having at least 4 carbon atoms, preferably at least 6 carbon atoms, in the alcohol residue, other than (a) and (b), or of a mixture of such monomers, (d) from 0 to 3% by weight, preferably from 0 to 2% by weight, of an ethylenically unsaturated carboxylic acid or of a mixture of ethylenically unsaturated carboxylic acids and (e) from 0 to 40% by weight, preferably from 5 to 35% by weight, of an ethylenically unsaturated monomer other than (a), (b), (c), and (d), or of a mixture of such monomers, the sum of the weight fractions of components (a), (b), (c), (d) and (e) always being 100% by weight.

The equivalents ratio of hydroxyl groups to monomer containing carbamate groups in this (meth)acrylate copolymer (B1) is preferably from 1:0.5 to 1:0.9.

Components (a), (c), (d) and (e) here correspond to the components already described above for the (meth)acrylate (co)polymers (A).

Component (b) is a monomer containing at least one carbamate group, the carbamate group being a product of the reaction of an epoxide and an acrylically unsaturated acid with subsequent reaction of the resultant hydroxyl group to carbamate, or a mixture of such monomers.

Alternatively it is preferred to prepare a (meth)acrylate (co)polymer (B) from components (a) to (e), where component (b) is from 0 to 50% by weight, preferably from 10 to 40% by weight, of a monomer which itself is a reaction product of an epoxide and an acid and then, in the resulting (meth)acrylate (co)polymer, to react the hydroxyl group resulting from the reaction of an epoxide and an acid of component (b) with an alkyl carbamate.

It is preferred if the alkyl carbamate used is methyl carbamate.

In one preferred embodiment the epoxide is a monoepoxide, preferably an epoxy ester, such as one of the glycidyl esters described above.

The epoxides described are reacted with an unsaturated, acid-functional compound in order to open the oxirane ring. Here it is possible, for example, to use acrylic acid and/or methacrylic acid.

The compounds (b) contain an α,□-ethylenically unsaturated organic radical by way of which they can be polymerized into the (meth)acrylate (co)polymer. The epoxide can be reacted before, during or after the polymerization. Where this reaction takes place during or after the polymerization, appropriate measures, which are common knowledge, must be taken to ensure that even after the reaction the resultant (meth)acrylate (co)polymer (B) contains hydroxyl groups and carbamate groups in sufficient number.

The ratio of all hydroxyl groups from constituents (A) and (B) to the carbamate groups from the compound (B) is preferably from 1:10 to 1:0.5, more preferably from 1:5 to 1:0.5, and with very particular preference from 1:2 to 1:1.

The oligomers and polymers (B) preferably have a number-average molecular weight of from 600 to 20,000, preferably from 800 to 15,000, more preferably from 1,000 to 10,000, with very particular preference from 1,200 to 8,000, and in particular from 1,200 to 6,000 daltons.

The coating materials used in the process for producing scratchproof coatings comprise amino resins (C) as crosslinking agents.

These resins (C) are condensation products of aldehydes, especially formaldehyde, with, for example, urea, melamine, guanamine and benzoguanamine. The amino resins contain alcohol groups, preferably methylol groups, which in general are partly or, preferably, fully etherified with alcohols. Use is made in particular of melamine-formaldehyde resins etherified with lower alcohols, particularly with methanol or butanol. Very particular preference is given to using as crosslinking agents melamine-formaldehyde resins which are etherified with lower alcohols, especially with methanol and/or ethanol and/or butanol, and which on average still contain from 0.1 to 0.25 nitrogen-bonded hydrogen atoms per triazine ring.

In this context it is possible to use any amino resins suitable for transparent topcoat or clearcoat materials, or a mixture of such resins. Particularly suitable are the conventional amino resins, some of whose methylol and/or methoxymethyl groups have been defunctionalized by means of carbamate or allophanate groups.

Crosslinking agents of this kind are described in patents U.S. Pat. No. 4,710,542 A and EP 0 245 700 B1 and also in the article by B. Singh and Coworkers, "Carbamylmethylated Melamines, Novel Crosslinkers for the Coatings Industry" in *Advanced Organic Coatings Science and Technology Series*, 1991, Volume 13, pages 193 to 207. On the melamine resins reference may also be made to Römpp Lexikon Lacke und Druckfarben, 1988, pages 374 and 375, "Melamine resins" and to the book "Lackadditive" [Additives for Coatings] by Johan Bieleman, 1988, pages 242 to 250, section on "Melamine-resin-crosslinking systems".

It is particularly preferred here if the crosslinking agent (C) is rich in melamine resin; that is accordingly is a melamine resin or amino resin mixture with a melamine resin fraction of at least 60% by weight, preferably at least 70% by weight, in particular at least 80% by weight, based in each case on the amino resin mixture.

Melamine resins are well known to the skilled worker and are supplied by numerous companies as sales products:

Examples of suitable, low molecular mass, fully etherified melamine resins are Cymel® 301 and 303 from Cytec, Luwipal® 066 from BASF Aktiengesellschaft, Resimene® and Maprenal® MF from Solutia.

Examples of suitable, comparatively low molecular mass, highly etherified melamine resins containing free imino groups are Cymel® 325 and 327 (methanol-etherified) and 1158 (butanol-etherified) from Cytec, Luwipale® 062 (methanol-etherified), 018 (butanol-etherified), and 014 (butanol-etherified, of relatively high viscosity) from BASF Aktiengesellschaft, Maprenal® MF 927 and 3950 (methanol-etherified), VMF 3611 and 3615 (butanol-etherified) and 580 (isobutanol-etherified), and also Resimene® 717 and 718 (methanol-etherified), and 750 and 5901 (butanol-etherified), and also MB 9539 from Solutia and Setamine® US 138 and US 146 (butanol-etherified) from Akzo Resins.

Examples of suitable, comparatively low molecular mass, partially etherified melamine resins are Luwipal® 012, 016, 015 and 010 from BASF Aktiengesellschaft, Maprenal® MF 590 and 600 from Solutia and Setamine® US 132 and 134 from Akzo Resins.

The coating materials of the invention comprise at least one compound of the general formula:

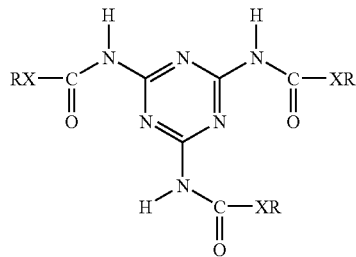

in which the variable R stands for an alkyl group having 1 to 12 carbon atoms, a cycloalkyl group having 3 to 12 carbon atoms or an aryl group having 6 to 20 carbon atoms, in particular for an alkyl group having 1 to 8 carbon atoms, and the variable X stands for a nitrogen, oxygen or sulfur atom, in particular an oxygen atom, as crosslinking agent(s) (D).

Accordingly, the tris(alkoxycarbonylamino)triazines are especially suitable crosslinking agents (D). Examples of particularly suitable tris(alkoxycarbonyl-amino)triazines (D) are described in patents U.S. Pat. No. 4,939,213A, U.S. Pat. No. 5,084,541 A, and EP 0 624 577 A1. Use is made in particular of the tris(methoxy-, tris(butoxy- and/or tris(2-ethylhexoxycarbonylamino)triazines. Of advantage are the methyl-butyl mixed esters, the butyl-2-ethylhexyl mixed esters, and the butyl esters. They have the advantage over the straight methyl ester of better solubility in polymer melts, and also tend less toward crystallization.

The weight ratio of crosslinking agent (C) to crosslinking agent (D) may vary widely and is guided by the requirements of the case in hand. Preferably, the weight ratio (C):(D) is from 40:1 to 1:1, more preferably from 30:1 to 1:1, with particular preference from 20:1 to 1:1 and in particular from 10:1 to 1.2:1.

The coating materials of the invention may where appropriate comprise at least one further crosslinking agent, (E), other than the amino resins (C) and (D). Agents (E) are selected from the group consisting of conventional crosslinking agents which crosslink with the hydroxyl groups of (A) and/or (B) and, in doing so, form ethers and/or esters, such as anhydrides, for example, and/or the conventional blocked and/or nonblocked polyisocyanates, as are described, for example, in German patent application DE 199 14 896 A1. Where blocked polyisocyanates (E) are present the coating materials of the invention are one-component systems.

Where nonblocked polyisocyanates (E) are used the coating materials of the invention are two-component systems.

The amount of the above-described essential constituents (A) and (B) in the coating materials of the invention may vary widely and is guided by the requirements of the case in hand, in particular by the functionality of complementary reactive groups in components (A) and (B) on the one hand and the crosslinking agents (C) and (D) on the other. The amount of the binders (A)+(B) is preferably from 30 to 80%, more preferably from 35 to 75%, with particular preference from 40 to 70% with very particular preference from 45 to 65% and in particular from 50 to 60% by weight, based in each case on the solid of the composition of the invention; the amount of the crosslinking agents (C)+(D) is preferably from 20 to 70%, more preferably from 25 to 65%, with particular preference from 30 to 60%, with very particular preference from 35 to 55%, and in particular from 40 to 50% by weight, based in each case on the solid of the composition of the invention.

Furthermore, the coating materials of the invention may also comprise at least one conventional additive (F) selected from the group consisting of binders other than the above-described binders (A) and (B), especially hydroxyl-containing binders;

reactive diluents; molecularly dispersipbly soluble dyes; light stabilizers, such as UV absorbers and reversible free-radical scavengers (HALS); antioxidants; low-boiling and high-boiling ("long") organic solvents; devolatilizers; wetting agents; emulsifiers; slip additives; polymerization inhibitors; crosslinking catalysts; adhesion promoters; leveling agents; film-forming auxiliaries; Theological aids, such as thickeners and pseudo-plastic sag control agents, SCAs; flame retardants; corrosion inhibitors; free-flow aids; waxes; siccatives; biocides; and flatting agents.

Examples of suitable additives (F) are described in detail in the textbook "Lackadditive" by Johan Bieleman, Wiley-VCH, Weinheim, New York, 1998, in D. Stoye and W. Freitag (Editors), "Paints, Coatings and Solvents", second, completely revised edition, Wiley-VCH, Weinheim, New York, 1998, "14.9. Solvent Groups", pages 327 to 373.

The coating materials of the invention comprising the constituents described above are used in particular as clearcoat materials for producing clearcoats or as starting products for the production of clear, transparent self-supporting films and moldings.

Alternatively, the coating materials of the invention may be pigmented. In that case they preferably comprise at least one conventional pigment (G) selected from the group consisting of organic and inorganic, transparent and opaque, color and/or effect, electrically conductive, magnetically shielding and fluorescent pigments, fillers, and nanoparticles.

The pigmented coating materials of the invention are used in particular as electrocoat materials, surfacers, basecoat materials and solid-color topcoat materials for producing electrocoats, surfacer coats or antistonechip primer coats, basecoats and solid-color topcoats, or for producing pigmented self-supporting films and moldings.

Where exclusively nonopaque pigments (G) are used, especially nanoparticles, the pigmented coating materials of the invention may also be used as clearcoat materials or for producing clear, transparent self-supporting films and moldings.

In terms of method, the preparation of the coating materials of the invention has no particular features but instead takes place by mixing and homogenizing the above-described constituents using conventional mixing techniques and apparatus such as stirred tanks, stirrer mills, extruders, compounders, Ultraturrax, inline dissolvers, static mixers, micromixers, toothed-wheel dispersers, pressure release nozzles and/or microfluidizers. It is essential here, however, to select the constituents of the coating materials of the invention such that, after they have been cured, the coating materials of the invention have the above-described, DMTA-determined mechanical-dynamic properties.

The resultant coating materials of the invention are, in particular, conventional coating materials comprising organic solvents. However, they may also be aqueous compositions, substantially or completely solvent-free and water-free liquid compositions (100% systems), substantially or completely solvent-free and water-free solid powders or substantially or completely solvent-free powder suspensions (powder slurries).

The coating materials of the invention are applied to conventional temporary or permanent substrates. For producing self-supporting films and moldings of the invention it is preferred to use conventional temporary substrates, such as metal belts and polymer belts or hollow bodies made of metal, glass, plastic, wood or ceramic, which can easily be removed without damaging the self-supporting films and moldings of the invention.

Where the coating materials of the invention are used for producing coatings, adhesive films and seals, permanent substrates are used, such as motor vehicle bodies and parts thereof, the interior and exterior of buildings and parts thereof, doors, windows, furniture, hollow glassware, coils, freight containers, packaging, small parts, electrical components, and components for white goods. The self-supporting films and moldings of the invention may likewise serve as substrates. Further examples of suitable substrates are known from German patent applications DE 199 24 172 A1, page 8 lines 21 to 37 or DE 199 30 067 A1, page 13 line 61 to page 14 line 16.

In terms of method, the application of the coating materials of the invention has no special features but can instead take place by any conventional application method suitable for the composition in question, such as, for example, electrocoating, spraying, squirting, knifecoating, brushing, flowcoating, dipping, trickling or rolling. It is preferred to employ spray application methods, unless the compositions in question are powders.

The application of the powders does not have particular features in terms of method either but instead takes place, for example, in accordance with the conventional fluid-bed methods, such as are known, for example, from the BASF Coatings AG brochures "Pulverlacke fuir industrielle Anwendungen", January 2000, or "Coatings Partner, Pulverlack Spezial", 1/2000, or from Römpp Lexikon Lacke und Druckfarben, Georg Thieme Verlag, Stuttgart, New York, 1998, pages 187 and 188, "Electrostatic Powder Spraying", "Electrostatic Spraying" and "Electrostatic Fluid-Bath Process".

The coating materials of the invention are used preferably for producing moldings and self-supporting films or as coating materials, adhesives, and sealants for producing coatings, adhesive films and seals. In particular, the coating materials are used for producing multicoat color and/or effect paint systems by the conventional wet-on-wet methods (cf., for example, German patent applications DE 199 14 896 A1, column 16 line 54 to column 18 line 57, and DE 199 30 067 A1, page 15 line 25 to page 16 line 36).

The curing of the applied coating materials of the invention likewise has no special features in terms of method but instead takes place with the aid of the conventional methods, such as thermally in particular, for example by heating in a forced-air oven or irradiation with IR lamps.

The coating compositions of the invention are used preferably for producing multicoat paint systems or in processes for producing multicoat paint systems, in that case preferably as topcoat material, particularly in the area of automotive OEM finishing. The present invention accordingly further provides a process for producing multicoat paint systems, in which (1) a pigmented basecoat material is applied to the substrate surface, (2) from the basecoat material a polymer film is formed, (3) a transparent topcoat material is applied to the resulting basecoat film, and then (4) the basecoat film and topcoat film are cured together, which comprises using a coating composition of the invention in at least one of the coating films. In this process it is preferred to use a coating composition of the invention as topcoat material.

In stage (1) of the process of the invention it is possible in principle to use all pigmented basecoat materials which are suitable for producing two-coat paint systems. Basecoat materials of this kind are well known to the skilled worker. Not only water-thinnable basecoat materials but also those based on organic solvents can be used. Suitable basecoat materials are described, for example, in U.S. Pat. No. 3,639, 147 A1, DE 33 33 072 A1, DE 38 14 853 A1, GB 2 012 191 A, U.S. Pat. No. 3,953,644 A1, EP 0 260 447 A1, DE 39 03 804 A1, EP 0 320 552 A1, DE 36 28 124 A1, U.S. Pat. No. 4,719,132 A1, EP 0297 576 A1, EP 0 069 936 A1, EP 0 089 497 A 1, EP 0 195 931 A1, EP 0 228 003 A1, EP 0 038 127 A1 and DE 28 18 100 A1. These patent documents are also a source of further information on the basecoat/clearcoat process in question.

The resultant coatings and self-supporting films of the invention, particularly the single-coat or multicoat color and/or effect paint systems and clearcoats of the invention, especially the clearcoats, are easy to produce and have outstanding optical properties (appearance) and very high light stability, chemical resistance, water resistance, condensation resistance, weathering stability, and etch resistance. In particular they are free from turbidity and inhomogeneity. They have an outstanding scratch resistance and abrasion resistance in combination with an outstanding surface hardness and acid resistance. Surprisingly the coatings, especially the clearcoats, when exposed to the realistic AMTEC test, only suffer a difference in gloss before and after exposure of less than 35, preferably less than 30, and in particular less than 25 units, which underlines their particularly high scratch resistance.

The adhesive films of the invention join a wide variety of substrates firmly and durably to one another and have a high chemical and mechanical stability even under conditions of extreme temperature and/or temperature fluctuation.

Similarly, the seals of the invention seal the substrates permanently and exhibit a high chemical and mechanical stability even under conditions of extreme temperature and/or temperature fluctuation and even in conjunction with exposure to aggressive chemicals.

Accordingly, the primed or unprimed substrates that are commonly employed in the technology fields addressed above and which have been coated with at least one coating of the invention, bonded with at least one adhesive film of the invention, sealed with at least one seal of the invention and/or wrapped or packaged with at least one self-supporting film of the invention or at least one molding of the invention combine a particularly advantageous profile of performance properties with a particularly long service life, which makes them particularly attractive both economically and environmentally.

EXAMPLES

Preparation Example 1

The Preparation of a Methacrylate Copolymer (A)

A laboratory reactor with a useful volume of 4 l, equipped with a stirrer, two dropping funnels for the monomer mixture and initiator solution respectively, a nitrogen inlet pipe, thermometer, and reflux condenser, was charged with 601 g of an aromatic hydrocarbons fraction having a boiling range from 158° C. to 172° C. The solvent was heated to 140° C. When 140° C. had been reached, a monomer mixture of 225.4 g of styrene, 169 g of n-butyl methacrylate, 293 g of cyclohexyl acrylate, 225.4 g of hydroxypropyl methacrylate, 202.8 g of 2-hydroxyethyl methacrylate and 11.2 g of acrylic acid was metered into the reactor at a uniform rate over the course of 4 hours and an initiator solution of 112.6 g of t-butyl perethylhexanoate in 40 g of the aromatic solvent described was metered into the reactor at a uniform rate over the course of 4.5 hours. The metering of the monomer mixture and of the initiator solution was commenced simultaneously. After the end of the initiator feed the reaction mixture was held at 140° C. for 2 hours more, then diluted with 119.6 g of the aromatic solvent described, and subsequently cooled. The resulting polymer solution had a solids content of 60% by weight (determined in a forced-air oven, 1 h at 130° C.). The methacrylate copolymer had a hydroxyl number of 156 mg KOH/g, an acid number of 10 mg KOH/g, a number-average molecular weight of 1,700, and a glass transition temperature of +65° C.

Preparation Example 2

The Preparation of a Methacrylate Copolymer (B) Containing Hydroxyl and Carbamate Groups A laboratory reactor having a useful volume of 4 l, equipped with a stirrer, two dropping funnels for the monomer mixture and initiator solution respectively, a nitrogen inlet pipe, thermometer, and reflux condenser, was charged with 176.7 g of an aromatic hydrocarbons fraction having a boiling range from 158° C. to 172° C., 188.8 g of methyl carbamate and 345.9 g of Cardura® E-10 (glycidyl ester of Versatic® acid, from Shell Chemie). The solvent was heated to 140° C. After 140° C. had been reached, a monomer mixture of 312 g of hydroxyethyl methacrylate, 85.4 g of cyclohexyl methacrylate, 117.41 g of methacrylic acid and 59.6 g of the aromatic solvent described and an initiator solution of 73.9 g of azoisovaleronitrile in 36.7 g of xylene were metered into the reactor at a uniform rate over the course of 1 hour. The reactor was furnished with a distillation bridge. Then a solution of 2 g of dibutyltin oxide in 106 g of xylene was added and the mixture was heated to 135° C. It was held at 135° C. and methanol was distilled off continuously until a hydroxyl number of 90 mg KOH/g was reached (determined by titrimetry). Thereafter, excess methyl carbamate was distilled off under reduced pressure at 14° C. for a period of two hours. The resulting polymer solution was diluted with methoxypropanol to a solids content of 70% by weight (determined in a forced-air oven, 1 h at 130° C.). The resin had a carbamate equivalent weight CEW of 440. The equivalents ratio of hydroxyl groups to carbamate groups was 1:1.4.

Preparation Example 3

The Preparation of a Rheological Aid (SCA)

1.76 parts by weight of hexamethylene diisocyanate and 2.3 parts by weight of butyl acetate 98/100 were charged to a receiver. A reactor equipped with reflux condenser and cooling means for reactor and receiver was charged with 91.7 parts by weight of the methacrylate copolymer solution (A) from preparation example 1 and 2.24 parts by weight of benzylamine. The contents of the receiver were metered into the reactor and the resulting mixture was circulated a number of times through an inline dissolver, during which the temperature did not exceed 40° C. The solution of the rheological aid was discharged from the reactor, and the lines were flushed with 2 parts by weight of butyl acetate 98/100. The resulting solution of the rheological aid had a solids content of 60% by weight.

Examples 1 and 2

Preparation of the Clearcoat Materials 1 and 2

For example 1, 3.7 parts by weight of the methacrylate copolymer solution (A) from preparation example 1, 35.2 parts by weight of the methacrylate copolymer solution (B) from preparation example 2, 5.7 parts by weight of Solvermol® 908 (commercial polyol from Cognis), 13.8 parts by weight of the solution of the rheological aid from preparation example 3, 16.7 parts by weight of a commercial etherified melamine resin (Resimene® BM 9539), 5 parts by weight of a tris-(alkoxycarbonylamino)triazine (TACT) (51 percent strength organic solution), 1.2 parts by weight of a blocked acid catalyst (Nacure® 5076 from King Industries), 1.9 parts by weight of Tinuvin® 384 and 0.8 part by weight of Tinuvin® 123 (both light stabilizers from Ciba), 0.2 part by weight of Byk® 310 (commercial leveling assistant (silicone oil) from Byk Chemie), 11.5 parts by weight of Solventnaphtha®, 0.5 part by weight of dimethyldodecylamine, 4 parts by weight of butanol, 3 parts by weight of butyl glycol acetate and 3 parts by weight of xylene were mixed thoroughly. This gave the clearcoat material 1.

For example 2, example 1 was repeated, replacing 31.6 parts by weight of the methacrylate copolymer solution (B) from preparation example 2 with 25.2 parts by weight thereof and replacing 5 parts by weight of TACT (51 percent strength) with 10 parts by weight thereof. This gave the clearcoat material 2.

The clearcoat materials 1 and 2 were stable on storage and of comparatively low viscosity. Their electrical resistance was comparatively low: clearcoat 1:220 kΩ; clearcoat 2:190 kΩ. Accordingly, the clearcoat materials could be applied very effectively by electrostatic means.

Free films were produced from the clearcoat materials 1 and 2, and these films were analyzed by DMTA. As a measure of the crosslinking density/scratch resistance, the storage modulus E' in the rubber-elastic range was ascertained: clearcoat materials 1 and 2: $E'=2\times10^7$ Pa. The clearcoat materials were therefore outstandingly suitable for producing scratchproof coatings.

Examples 3 and 4

The Production of Multicoat Paint Systems Using the Clearcoat Materials 1 and 2

For example 3, clearcoat material 1 was used.
For example 4, clearcoat material 2 was used.

The clearcoat materials 1 and 2 were each applied wet-on-wet to test panels which had each been coated with a baked electrocoat and with an uncured aqueous basecoat film. The resulting aqueous basecoat films and clearcoat films were baked at 140° C. for 20 minutes to give test panels featuring multicoat paint systems comprising in each case an aqueous basecoat and a clearcoat.

In order to test
the hardness according to Buchholz (DIN 53153:1977-11) and TUKON (Tukon® Microhardness Tester from Wilson-Wolpert-Shore Instruments),
the scratch resistance by the Rotahub test and by the Amtec-Kistler test (Amtec) using 1.5 g/l Sikron SH 200 ultrafine quartz powder (cf. T. Klimmasch, T. Engbert, Technology Conference, Cologne, DFO, Report volume 32, pages 59 to 66, 1997; the gloss to DIN 67530 is measured before and after damage; measurement direction perpendicular to the direction of scratching), and
the adhesion by the cross-cut test (DIN ISO 2409:1994-10) before and after exposure to condensation climate testing (CC; DIN 50017:1982), multicoat paint systems comprising a black aqueous basecoat produced from a commercial black aqueous basecoat material from BASF Coatings AG were used. The black basecoat was chosen since it allowed optimum observation of changes in the appearance of the multicoat paint systems in question, caused by mechanical damage.

The results of the tests can be found in Table 1.

TABLE 1

Hardness, scratch resistance, adhesion, and condensation resistance of the multicoat paint systems of Examples 3 and 4

| Test method | | Examples: 3 | 4 |
|---|---|---|---|
| Hardness: | | | |
| Buchholz | | 80/83 | 77/87 |
| TUKON | | 11.5 | 12.5 |
| Scratch Resistance: | | | |
| Rotahub Test | before exposure | 91 | 92 |
| | after exposure | 83 | 72 |
| | Δ gloss | 8 | 20 |
| Amtec Test | before exposure | 91 | 92 |
| | after exposure | 73 | 72 |
| | Δ gloss | 18 | 20 |
| | reflow (2 h/60° C.) | 74 | 74 |
| | Δ gloss reflow | 17 | 18 |
| Adhesion: | | | |
| Cross-cut test | before exposure | 0.5 | 0.5 |
| | 24 h after exposure in CC test | 0.5 | 0.5 |
| Condensation climate testing: | | | |
| blistering 1 h after exposure | amount | 0 | 0 |
| | size | 0 | 0 |
| | swelling | slight | slight |

The results underscore the high gloss and high hardness, scratch resistance, adhesive strength and condensation resistance of the multicoat paint systems.

For testing in accordance with
the oil soot test according to General Motors GME 60403,
the sulfuric acid test according to General Motors GME 60409, and
the FAM standard test fuel test (50% by volume toluene, 30% by volume isooctane, 15% by volume diisobutylene, 5% by volume ethanol, in accordance with VDA (German automakers association) test bulletin 621-412, based on DIN standard 53 168), multicoat paint systems were used which comprised a metallic aqueous basecoat produced from the commercial aqueous basecoat material Starsilber III from BASF Coatings AG.

The results can be found in Table 2.

TABLE 2

Oil soot, sulfuric acid and test fuel resistance of the multicoat paint systems of examples 3 and 4

| Test method | | Examples: 3 | 4 |
|---|---|---|---|
| Oil soot test | 120 h | 8 | 8 |
| (target = 8 after 144 h): | 144 h | 8 | 8 |
| | 168 h | 8 | 8 |
| Sulfuric acid test | 48 h | 8 | 6 |

TABLE 2-continued

Oil soot, sulfuric acid and test fuel resistance of the multicoat paint systems of examples 3 and 4

| Test method | | Examples: | |
|---|---|---|---|
| | | 3 | 4 |
| (target = 8 after | 72 h | 6 | 2 |
| 72 h): | 96 h | 6 | 2 |
| FAM standard test | before exposure | 0 | 0 |
| fuel test: | after exposure | 0 | 0 |

The results underscore the high resistance of the multicoat paint systems to oil soot, sulfuric acid and condensation.

To test the yellowing resistance, multicoat paint systems were used which comprised a white aqueous basecoat produced from the commercial aqueous basecoat material Candyweiβ from BASF Coatings AG. For the investigation the aqueous basecoat films and clearcoat films were baked in one case at 140° C. for 20 minutes (series 1) and in one case at 160° C. for 30 minutes (series 2). The yellow values of the multicoat paint systems from series 1 and 2 were determined by yellow-value colorimetry in accordance with the Cielab method. The following differences in yellow values were found: multicoat paint system of example 3: Δb=0.7; multicoat paint system of example 4: Δb=0.7. The results demonstrate the high yellowing resistance of the multicoat paint systems.

What is claimed is:

1. A coating material comprising
(A) at least one hydroxyl-containing (meth)acrylate (co)polymer having a hydroxyl number of from 100 to 250 mg KOH/g, an acid number of from 0 to 35 mg KOH/g, a number-average molecular weight $M_n$ of from 1,200 to 20,000 daltons, and a glass transition temperature of not more than +70° C.,
(B) at least one carbamate- and hydroxyl-functional compound having a hydroxyl number of from 10 to 150 mg KOH/g, a carbamate equivalent weight CEW of from 250 to 700 g/equivalent and an equivalents ratio of hydroxyl to carbamate groups of from 1:20 to 1:0.5,
(C) at least one amino resin, and
(D) at least one compound of the general formula

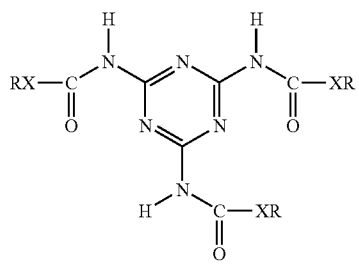

in which the variable R stands for an alkyl group having 1 to 12 carbon atoms, a cycloalkyl group having 3 to 12 carbon atoms or an aryl group having 6 to 20 carbon atoms and the variable X stands for a nitrogen, oxygen or sulfur atom;
where
(I) at least 10 equivalent % of the hydroxyl groups present in the (meth)acrylate (co)polymers (A) and/or the compounds (B) are primary hydroxyl groups and (II) the coating material, after it has been cured, has a storage modulus E' in the rubber-elastic range of at least $1.5*10^7$ Pa, the storage modulus E' having been measured by dynamic mechanical thermoanalysis (DMTA) on homogeneous free films with a thickness of 40±10 μm.

2. The coating material as claimed in claim 1, wherein the glass transition temperature of the (meth)acrylate (co)polymers (A) is from −40 to 70° C.

3. The coating material as claimed in claim 1, wherein the (meth)acrylate (co)polymers (A) have a hydroxyl number from 160 to 220 mg KOH/g and/or a number-average molecular weight $M_n$ of from 1,500 to 15,000 daltons.

4. The coating material as claimed in claim 1, wherein the methacrylate copolymers (A) are prepared by copolymerizing
(a1) from 10 to 51% by weight of monomers selected from the group consisting of 4-hydroxy-n-butyl acrylate, 4-hydroxy-n-butyl methacrylate and mixtures thereof,
(b1) from 0 to 36% by weight of monomers selected from the group consisting of hydroxyl-containing esters of acrylic acid and hydroxyl-containing esters of methacrylic acid, each other than (a1), mixtures thereof,
(c1) from 28 to 58% by weight of monomers selected from the group consisting of aliphatic esters of (meth)acrylic acid having at least 4 carbon atoms in the alcohol residue, and cycloaliphatic esters of (meth)acrylic acid having at least 4 carbon atoms in the alcohol residue, where each is other than (a1) and (b1), and mixtures of such monomers,
(d1) from 0 to 3% by weight of compounds selected from the group consisting of ethylenically unsaturated carboxylic acids and mixtures thereof, and
(e1) from 0 to 40% by weight of monomers selected from the group consisting of vinylaromatic monomers and ethylenically unsaturated monomers each being other than (a1), (b1), (c1), and (d1), and mixtures thereof,
the sum of the weight fractions of components (a1), (b1), (c1), (d1) and (e1) always being 100% by weight.

5. The coating material as claimed in claim 1, wherein the methacrylate copolymers (A) are prepared by copolymerizing
(a2) from 10 to 51% by weight of monomer(s) selected from the group consisting of hydroxypropyl methacrylate and hydroxyethyl methacrylate, and mixtures there,
(b2) from 0 to 36% by weight of monomers selected from the group consisting of hydroxyl-containing esters of acrylic acid and hydroxyl-containing ester of methacrylic acid, each being other than (a2), and mixtures thereof,
(c2) from 28 to 58% by weight of monomers selected from the group consisting of aliphatic esters and cycloaliphatic esters of (meth)acrylic acid having at least 4 carbon atoms in the alcohol residue, each being other than (a2) and (b2), and mixtures thereof,
(d2) from 0 to 3% by weight of compounds selected from the group consisting of ethylenically unsaturated carboxylic acids and mixtures thereof, and
(e2) from 0 to 40% by weight of monomers selected from the group consisting of vinylaromatic and ethylenically unsaturated monomers each other than (a2), (b2), (c2), and (d2), and mixtures thereof,
the sum of the weight fractions of components (a2), (b2), (c2), (d2) and (e2) always being 100% by weight.

6. The coating material as claimed in claim 1, wherein compound (B) is a (meth)acrylate (co)polymer containing hydroxyl groups and carbamate groups.

7. The coating material as claimed in claim 1, wherein the compound (B) has a hydroxyl number of from 15 to 120 mg KOH/g.

8. The coating material as claimed in claim 1, wherein the compound (B) has a carbamate equivalent weight of from 300 to 600 g/equivalent.

9. The coating material as claimed in claim 1, wherein the ratio of hydroxyl groups to carbamate groups of the compound (B) is from 1:15 to 1:0.8.

10. The coating material as claimed in claim 1, wherein the ratio of the hydroxyl groups of the constituents (A) and (B) to the carbamate groups of the compound (B) is from 0:10 to 1:0.5.

11. The coating material as claimed in claim 1, wherein at least 15 equivalent % of the hydroxyl groups present in the (meth)acrylate (co)polymers (A) and the compounds (B) are primary hydroxyl groups.

12. The coating material as claimed in claim 1, wherein the crossliniking agent (C) is a melamine resin or an amino resin mixture having a melamine resin content of at least 60% by weight, based on the amino resin mixture.

13. The coating material as claimed in claim 1, wherein the variable R in the general formula stands for an alkyl group having 1 to 8 carbon atoms and/or the variable X in the general formula stands for an oxygen atom.

14. The coating material as claimed in claim 1, further comprising at least one of a crossliniking agent (L) other than (C) and (D), an additive (F) and a pigment (G).

15. The coating material as claimed in claim 1 which after it has cured has a storage modulus E' of at least $5*10^7$ Pa.

16. A process for preparing a coating material as claimed in claim 1, in which
  (A) at least one hydroxyl-containing (meth)acrylate (co)polymer,
  (B) at least one compound containing carbamate groups and hydroxyl groups,
  (C) at least one amino resin, and
  (D) at least one compound of the general formula

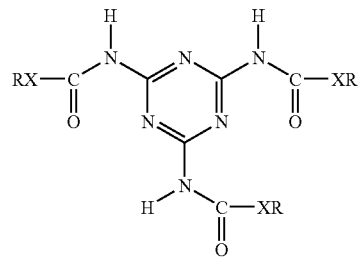

in which the variables R and X are as defined above are mixed with one another and the resulting mixture is homogenized, wherein the constituents of the coating materials are selected such that
  (I) at least 10 equivalent % of the hydroxyl groups present in the (meth)acrylate (co)polymers (A) and/or the compounds (B) are primary hydroxyl groups and
  (II) the coating material, after it has been cured, has a storage modulus E' in the rubber-elastic range of at least $1.5*10^7$ Pa, the storage modulus E' having been measured by dynamic mechanical thermoanalysis on homogeneous free films with a thickness of 40±10 μm.

17. A composition selected from the group consisting of coatings, adhesive films, seals, moldings and self-supporting films comprising the coating material of claim 1.

18. Coatings as claimed in claim 17, comprising one of a clearcoat and a pigmented paint system.

19. A coating as claimed in claim 18, comprising a multicoat paint system.

20. Coatings as claimed in claim 19, wherein the coatings are clearcoats of multicoat paint systems.

21. A coating as claimed in claim 17, wherein the coating exhibits a gloss difference in the AMTEC test of less than 35 units.

* * * * *